United States Patent
Kim et al.

(10) Patent No.: US 12,077,394 B2
(45) Date of Patent: Sep. 3, 2024

(54) ARRANGEMENT SYSTEM FOR ARRANGING ITEM DRAWN OUT FROM PACKING BOX

(71) Applicant: CJ CHEILJEDANG CORPORATION, Seoul (KR)

(72) Inventors: Myung Ho Kim, Jincheon-eup (KR); Sung Woo Park, Jincheon-eup (KR); Bong Yong Sung, Gimhae-si (KR); Hee Dong Son, Changwon-si (KR); Dae Hwa Kim, Osan-si (KR); Sun Kyu Kim, Hwaseong-si (KR); Soo Hyun Kim, Gimpo-si (KR); Hak Dong Kim, Suwon-si (KR); In Soo Jung, Suwon-si (KR)

(*) Notice: Subject to any disclaimer, the term of this patent is extended or adjusted under 35 U.S.C. 154(b) by 175 days.

(21) Appl. No.: 17/801,147

(22) PCT Filed: Feb. 19, 2021

(86) PCT No.: PCT/KR2021/002126
§ 371 (c)(1),
(2) Date: Aug. 19, 2022

(87) PCT Pub. No.: WO2021/167401
PCT Pub. Date: Aug. 26, 2021

(65) Prior Publication Data
US 2023/0074104 A1    Mar. 9, 2023

(30) Foreign Application Priority Data
Feb. 19, 2020    (KR) .................. 10-2020-0020679

(51) Int. Cl.
*B65G 47/90*    (2006.01)
*B65B 69/00*    (2006.01)
*B65G 43/08*    (2006.01)
*B65G 59/02*    (2006.01)

(52) U.S. Cl.
CPC ............ *B65G 47/902* (2013.01); *B65B 69/00* (2013.01); *B65G 43/08* (2013.01); *B65G 59/02* (2013.01); *B65G 2203/0225* (2013.01)

(58) Field of Classification Search
CPC ...... B65G 47/902; B65G 43/08; B65G 59/02; B65G 2203/0225; B65B 69/00
(Continued)

(56) References Cited

U.S. PATENT DOCUMENTS 9,969,565 B1    5/2018    Simm

FOREIGN PATENT DOCUMENTS

| CN | 114194767 | * | 3/2022 |
| CN | 115313788 | * | 11/2022 |

(Continued)

OTHER PUBLICATIONS

International Search Report from WIPO in related Application No. PCT/KR2021/002126 dated Jun. 18, 2021.
(Continued)

*Primary Examiner* — Gene O Crawford
*Assistant Examiner* — Lester Rushin, III
(74) *Attorney, Agent, or Firm* — Dilworth IP, LLC (57) ABSTRACT

A system for aligning items, which includes a packaging box transfer device to transfer a packaging box accommodating items therein, a fixing device to fix, at a withdrawal position where the items are taken out of the packaging box, the packaging box transferred by the packaging box transfer device with its top open, a withdrawal device to move to a space in which the items are accommodated in the packaging box so as to suck and take out the items, an item transfer device to transfer the items taken out by the withdrawal device with the items placed on the item transfer device, a sensor mounted on the withdrawal device to detect directions of the items taken out by the withdrawal device, and a (Continued)

rotating device to rotate the items taken out by the withdrawal device with the items placed on the rotating device.

5 Claims, 7 Drawing Sheets

(58) Field of Classification Search
USPC .................................................... 198/464.1
See application file for complete search history.

(56) References Cited

FOREIGN PATENT DOCUMENTS

| CN | 116534353 A | * | 8/2023 |
|---|---|---|---|
| DE | 4030215 A1 | | 3/1992 |
| EP | 0528772 A1 | | 2/1993 |
| JP | 2002-068472 A | | 3/2002 |
| JP | 2003-136458 A | | 5/2003 |
| JP | 2008-247494 A | | 10/2008 |
| JP | 2009102058 A | | 5/2009 |
| KR | 10-1999-000278 A | | 1/1999 |
| KR | 20-2011-000614 U | | 7/2011 |
| KR | 10-2156351 B1 | | 9/2020 |
| KR | 102636032 | * | 2/2024 |
| WO | 2004065266 A2 | | 8/2004 |

OTHER PUBLICATIONS

Extended European Search Report issued in European Patent Application No. 21757021.7, mailed Aug. 10, 2023.

* cited by examiner

ARRANGEMENT SYSTEM FOR ARRANGING ITEM DRAWN OUT FROM PACKING BOX

FIELD OF THE INVENTION

The present disclosure relates to a system for aligning items taken out of a packaging box, and more particularly, to a system for taking out and aligning items accommodated in a packaging box and having directionality.

BACKGROUND OF THE INVENTION

Rectangular parallelepiped boxes are widely used as packaging containers for transporting and storing items.

Figure 1:
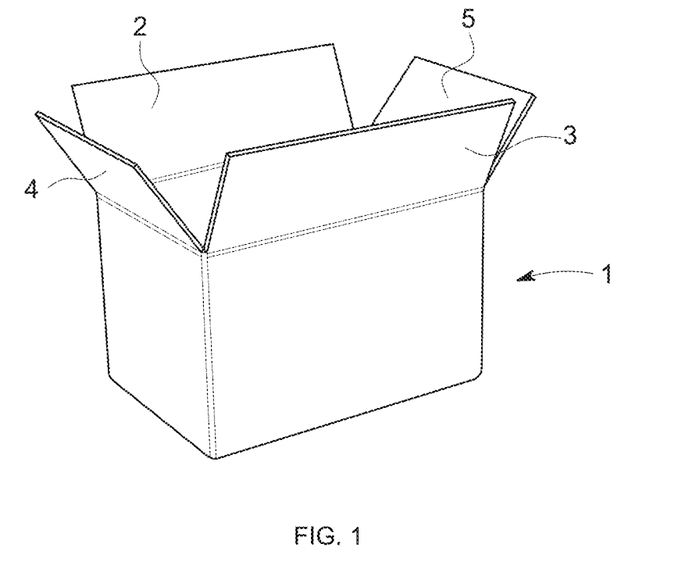
FIG. 1 is a perspective view illustrating an open state of a type of packaging box used in a system for aligning items according to an embodiment of the present disclosure.

FIG. 1 illustrates a type of packaging box that is used widely.

The packaging box, which is designated by reference numeral 1, is mainly made of paper coated with a synthetic resin film and has a top and a bottom, which are each covered by four panels extending from the side of the packaging box so that the packaging box is closed.

Since the top and bottom of the packaging box have the same structure, the top thereof will be described with reference to FIG. 1. The top of the packaging box is closed by folding the four panels 2 to 5, which consist of two pairs of panels, from the respective side edges thereof so that the ends thereof abut against or are adjacent to each other. A pair of panels 4 and 5 are folded facing each other and the other pair of panels 2 and 3 are then folded facing each other so that these pairs of panels are placed vertically.

In this way, the top of the box is closed. The packaging box is closed so as not to be opened by an external force by binding the abutting ends of the first pair of panels 2 and 3 folded and placed upward with an adhesive tape.

The bottom of the packaging box is configured and closed in the same manner as the top thereof. After items are inserted from above and accommodated in the packaging box, the packaging box is closed by folding the upper panels 2 to 5 and binding the ends of the pair of panels 2 and 3 with the adhesive tape, as described above. The closed packaging box is transported.

On the other hand, when it is intended to open the packaging box accommodating items to take the items out thereof, the adhesive tape that binds the panels 2 and 3 is cut. Subsequently, the top of the packaging box is opened by unfolding all the panels 2 to 5 outward and the item in the packaging box is then taken out.

There is no problem in the case where the items in the packaging box are general consumer items. However, in the case of items used in a manufacturing process for mass production, it is a very simple operation to align the items in a specific direction in order to take the items out of the packaging box and insert them into the manufacturing process, but it requires a lot of labor and increases costs to manufacture.

Meanwhile, Korean Patent No. 10-1554009 (Document 1) discloses an invention entitled "PACKAGING BOX WITH WINDOW STRUCTURE FOR TAKING OUT STICK CONFECTIONERY PRODUCT". The packaging box in Document 1 presents a configuration that makes it easy to take out items accommodated in the packaging box.

However, the packaging box in Document 1 only discloses a configuration that makes it convenient for a consumer to store items in the box and then take out the items one by one when necessary, and does not disclose a configuration aligned suitable for taking a large number of items out of the packaging box and aligning and transferring the items, which is required in a manufacturing process for mass production.

In addition, Korean Patent No. 10-1527654 (Document 2) discloses an invention entitled "PACKAGING BOX FOR EASY WITHDRAWAL OF ITEM". The packaging box in Document 2 proposes a structure that makes it easy to take out items.

However, the packaging box in Document 2 is easily opened and makes it easy to take out items, but it does not disclose a configuration or device for automatically performing withdrawal and alignment operation.

As such, the prior art proposes a technique for easily taking out the items accommodated in the packaging box, and the packaging box has a special form for easy withdrawal. However, there is no disclosure or consideration for a system capable of taking items out of a common structured packaging box and aligning them.

SUMMARY OF THE INVENTION

Technical Problem

Various embodiments are directed to a system for taking items out of a packaging box and aligning them.

Specifically, various embodiments are directed to a system for, when items taken out of a packaging box has directionality, aligning the items in a specific direction while taking out the same.

In particular, various embodiments are directed to a system for taking out items configured, when a plurality of directional items are accommodated in a packaging box, to detect the directionality of the items accommodated in the packaging box and to align and transfer the taken-out items in one direction.

In addition, various embodiments are directed to a system for, when a plurality of items having directionality are accommodated in a packaging box, simultaneously taking out, aligning, and transferring the items.

Technical Solution

In an embodiment, there is provided a system for taking out, aligning, and transferring items having directionality and accommodated in a packaging box with an open top.

The system according to the present disclosure comprises: a packaging box transfer device configured to transfer a packaging box accommodating items therein; a fixing device configured to fix, at a withdrawal position where the items are taken out of the packaging box, the packaging box transferred by the packaging box transfer device with its top open; a withdrawal device configured to move to a space in which the items are accommodated in the packaging box so as to suck and take out the items; an item transfer device configured to transfer the items taken out by the withdrawal device with the items placed on the item transfer device; a sensor mounted on the withdrawal device to detect directions of the items taken out by the withdrawal device; and a rotating device configured to rotate the items taken out by the withdrawal device with the items placed on the rotating device.

When the direction of each item detected by the sensor is different from a predetermined item direction, the withdrawal device places the item on the rotating device, and after the rotating device rotates to change the direction of the item to the predetermined direction, the item is clamped and transferred to the item transfer device by the withdrawal device.

In the system of the present disclosure, the packaging box transferred by the packaging box transfer device is fixed by the fixing device, and the items are taken out of the top of the packaging box and transferred to the item transfer device by the withdrawal device.

When there is an item, which is accommodated in a direction different from the predetermined direction, from among the items accommodated in the packaging box, the sensor mounted on the withdrawal device detects the direction of the item in the process of taking the item out of the packaging box, and the withdrawal device places only a wrongly oriented item on the rotating device, corrects the direction of the item using the rotating device, and transfers the same to the item transfer device.

In various embodiments of the present disclosure, the present disclosure is applicable to each item having different diameters at both longitudinal ends thereof.

In the embodiment in which the items each having different diameters at both longitudinal ends thereof, the sensor may detect the direction of the item by detecting the diameter of one end thereof. The item transfer device may transfer the items with their longitudinal axes parallel to each other. The items may be rotated with their longitudinal directions placed perpendicular to the axis of rotation of the rotating device.

The system of the present disclosure may be more advantageously used when a plurality of items are accommodated in parallel with each other and stacked vertically in the packaging box.

The withdrawal device may simultaneously take out the items accommodated in parallel with each other. An item, which is not oriented in the predetermined item direction, of the concurrently taken out items may be placed on and rotated by the rotating device, and then transferred by the withdrawal device to the item transfer device.

In various embodiments of the present disclosure,

The item transfer device may include a conveyor belt on which the items are arranged and transferred by the withdrawal device, and the rotating device is disposed above the conveyor belt of the item transfer device.

The rotating device may move between an upper side of a placement position where the withdrawal device places the items on the conveyor belt of the item transfer device and an avoidance position spaced from the upper side of the placement position in an item transfer direction of the item transfer device. When the withdrawal device places, on the rotating device, an item oriented in a direction different from the predetermined item direction, the rotating device may move to the upper side of the placement position. When the withdrawal device places the item on the conveyor belt of the item transfer device, the rotating device may move to the avoidance position.

In various embodiments, the rotating device may include rails extending along both widthwise sides of the conveyor belt of the item transfer device, a linear drive table moving along the rails, a rotary table configured to rotate about its vertical axis with respect to the linear drive table, and a rotary drive mechanism configured to rotate the rotary table.

Advantageous Effects

According to the system for aligning items of the present disclosure, when the direction of an item is different from a predetermined direction in the process of taking out and transferring items accommodated in a packaging box, the item in a different direction is not transferred to a subsequent process, but aligned to have the same direction as other items and transferred. Accordingly, there is no problem in that the process is stopped due to the item in a different direction in the subsequent process, and the operator finds and corrects the item in a different direction in the subsequent process.

In particular, since the direction of the item is detected in the process of taking the item out of the packaging box without configuring a separate system to find and correct the item whose direction is different from the predetermined direction, there is no delay in the process because a separate process for detecting the direction of the item is not required.

In addition, since the process of correcting the direction of the misdirected item is performed in a rotating device separate from the item transfer device, the process of transferring the item to correct the direction of the misdirected item is not interrupted.

If both longitudinal ends of the item have different diameters, it is possible to implement a system with low cost and highly reliable operation by using a simple and reliable sensor that determines the difference in diameter of the item without using expensive and time-consuming instruments such as imaging equipment that acquires the shape of the item and determines the direction.

In particular, since the operation of correcting the direction of the item is implemented by a simple device for rotating the item, the implementation of the system is easy and inexpensive.

The system can process multiple items at the same time, and simultaneously align the items even when there are a plurality of items in the wrong direction among the items being processed at the same time.

The rotating device, which rotates the item in a different direction, does not cause the withdrawal device to interfere with the operation of the device for placing the items in the item transfer device or interrupt the operation of placing the items.

In particular, the item is rotated at a position close to the position where the item is transferred. Therefore, the operation of the withdrawal device to transfer the item between the rotating device and the item transfer device can be accomplished in a short time by having a short working distance, and the system can be configured compactly without occupying a large area.

DETAILED DESCRIPTION OF THE INVENTION

Hereinafter, the configuration and operation of a system for aligning items according to an embodiment of the present disclosure will be described in detail with reference to the drawings.

The system of the present embodiment is configured to take items out of a packaging box and align the items as illustrated in FIG. 1. The items accommodated in the packaging box to be taken out by the system of the present embodiment are an in-line container 6 as in the perspective views of FIGS. 4 and 5 and in the cross-sectional view of FIG. 6.

Figure 6:
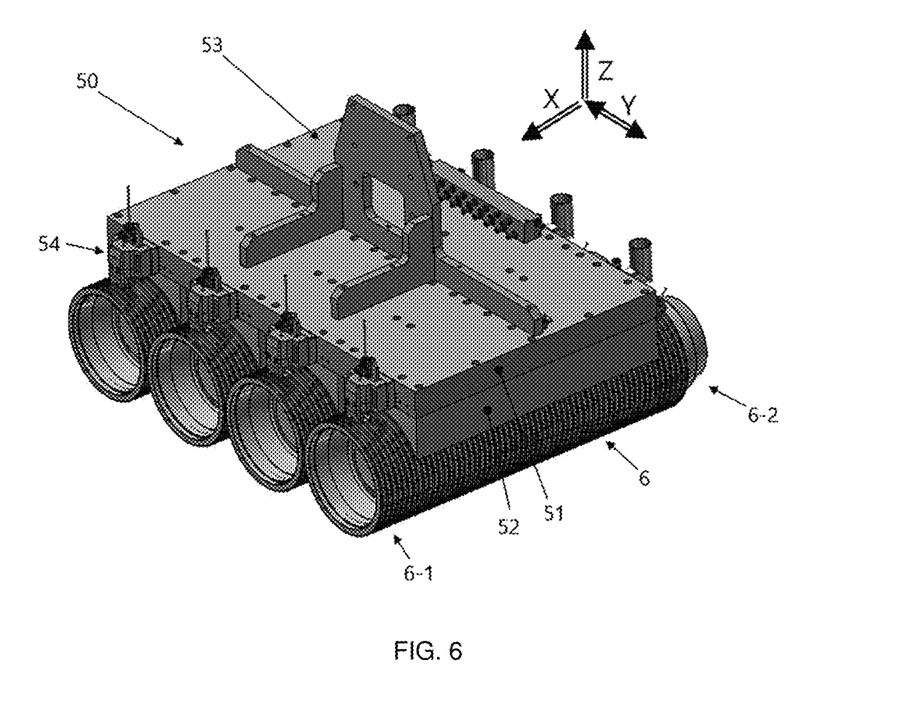
FIGS. 6 and 7 are perspective and top views illustrating a clamp in the system according to the embodiment of the present disclosure.

The in-line container 6 illustrated in FIG. 6 is formed by overlapping bowl-shaped containers made of synthetic resin for accommodating food and wrapping them in a packaging film (not shown). Each container has a bottom surface, a circumferential surface, and an open top surface. The container has a cylindrical shape as a whole, but the bottom surface is a smaller diameter than the top surface. Accordingly, the in-line container 6 formed by overlapping containers is configured such that each container has one end 6-2 (in FIG. 6) exposed at the bottom surface thereof and the other end 6-1 (in FIG. 6) exposed at the top surface thereof in the longitudinal direction thereof, the diameter of one end being smaller than that of the other end.

This in-line container 6 is wrapped in the packaging film so that its longitudinal direction is parallel to the bottom or top of a rectangular parallelepiped packaging box 1 therein. In the packaging box, four in-line containers 4 are placed side by side and are vertically stacked in three rows, with a consequence that a total of 12 in-line containers are accommodated.

However, this in-line container 6 is only an example of the item accommodated in the packaging box, and the present disclosure is not limited to the form of the item or the stacked form in the packaging box. All items may taken out of the packaging box and aligned by the system of the present disclosure as long as the items accommodated in the packaging box have the same form and specific directionality and are accommodated regularly in the packaging box 1.

Figure 2:
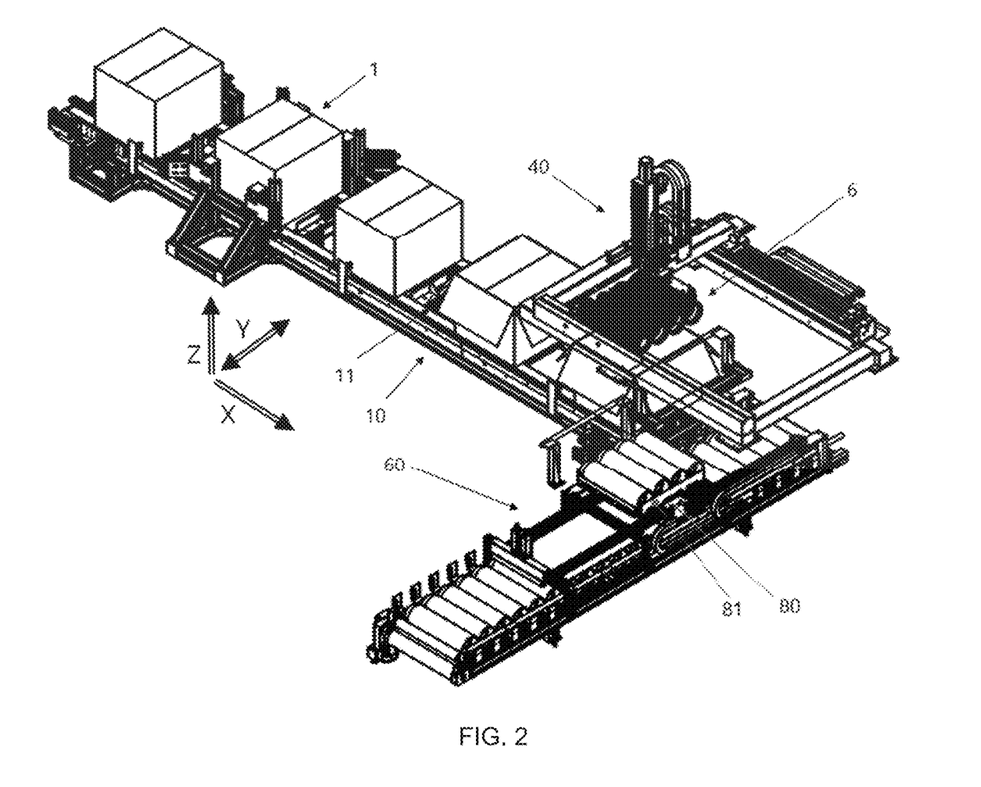
FIGS. 2 and 3 are perspective and side views illustrating an overall configuration of the system according to the embodiment of the present disclosure.
Figure 3:
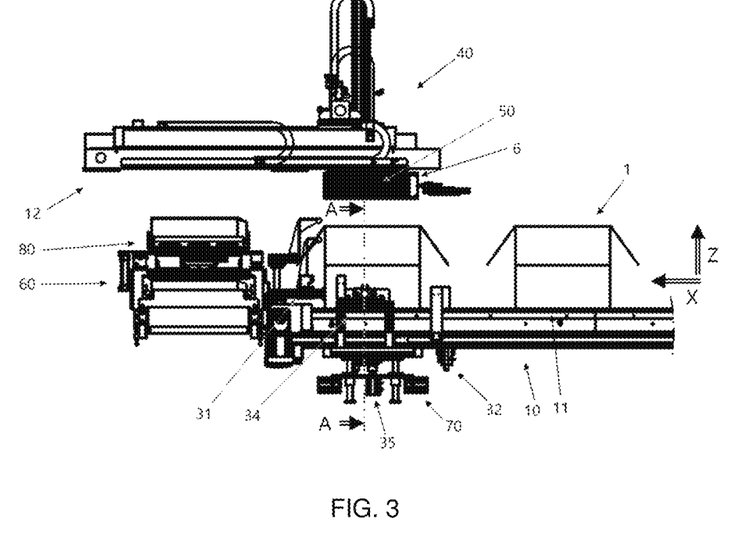

FIGS. 2 and 3 illustrate part of a unit for opening the packaging box 1 and unfolding the top thereof to take the in-line container 6 out of the packaging box 1, in addition to devices or mechanisms constituting the system according to the embodiment of the present disclosure.

The packaging box 1 is transferred to a withdrawal position beneath a withdrawal device 40 by a first conveyor 11 in a state in which the adhesive tape binding the upper panels 2 and 3 is cut and the four upper panels 2 to 5 are unfolded.

The system of the present embodiment largely includes a first conveyor 11 as a packaging box transfer device configured to transfer a packaging box 1 accommodating an in-line container 6 as an item to be taken out, four fixing plate devices 31 to 34 and one suction fixing device 35 as a fixing means for fixing the packaging box 1 at a position where the in-line container 6 is taken out of the packaging box 1, a withdrawal device 40 as a withdrawal means for moving to a space in which the in-line container 6 is accommodated in the packaging box 1 so as to take out the in-line container 6 by suctioning the same, a first transfer conveyor 60 as an item transfer means for transferring the in-line container 6 taken out by the withdrawal device 40 with the in-line container 6 placed on the first transfer conveyor 60, a second transfer conveyor 70 as a box transfer means for discharging, out of the system, an empty packaging box 1 from which the in-line container 6 is taken out, a rotating device 80 rotated by 180 degrees in a state in which an in-line container 6, accommodated in a different direction from other in-line containers 6 in the packaging box 1, is taken out by the withdrawal device 40 and placed on the rotating device 80, and a frame 10 to which the above devices are coupled and supported.

The packaging box 1 accommodating the in-line container 6 is transferred by the first conveyor 11 to a position where the withdrawal device 40 is disposed. Although not illustrated in the drawings, a unit for unfolding the upper panels 2 to 5 of the packaging box is disposed around the first conveyor 11. Thus, the packaging box is opened at the top thereof before it is transferred by the first conveyor 11 toward the withdrawal device 40.

Figure 4:
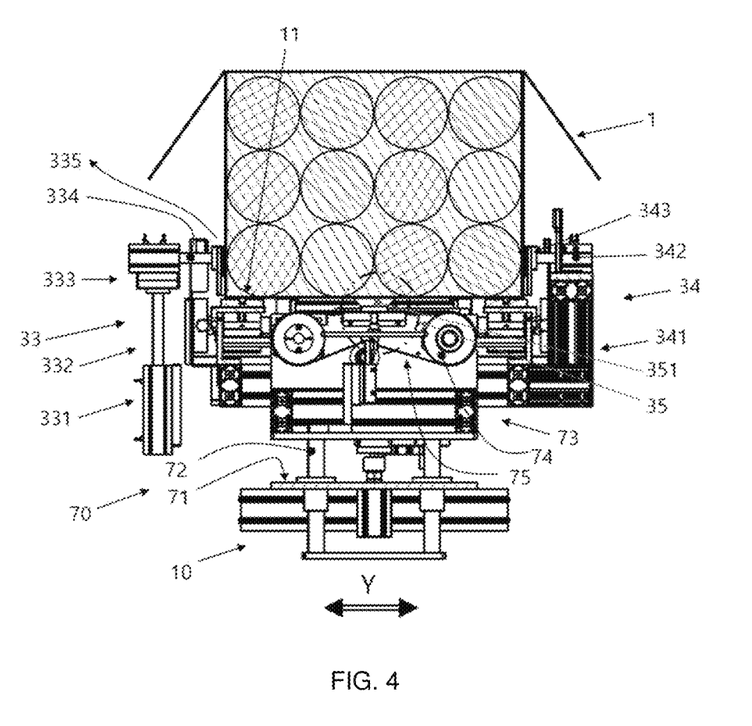
FIG. 4 is a cross-sectional view taken along line A-A of FIG. 3.

Referring to FIG. 4, the first conveyor 11 includes two conveyor belts parallel to each other. Thus, the first conveyor 11 transfers and supports the packaging box 1 before transferring an empty packaging box 1 from which the in-line container 6 is taken out by the withdrawal device 40.

When the packaging box 1 reaches a position where the withdrawal device 40 takes out the in-line container 6, the first conveyor 11 stops and the packaging box 1 is fixed to the withdrawal position by the four fixed plate devices 31 to 34 and one suction fixing device 35.

The four fixing plate devices 31 to 34 abut against the four sides of the packaging box 1, respectively.

The first fixing plate device 31 has a panel, which abuts against the packaging box, while facing the packaging box downstream in the transfer direction of the packaging box 1 (indicated by arrow X in FIG. 3). The second fixing plate device 32 has a panel, which abuts against the packaging box, while facing the packaging box upstream in the transfer direction of the packaging box 1.

Here, the second fixing plate device 32 is disposed between the two conveyor belts of the first conveyor 11. Accordingly, in order not to interfere with the transfer of the packaging box 1, the second fixing plate device 32 is maintained beneath the first conveyor 11 during the transfer of the packaging box, whereas it rises after the packaging box 1 stops at the withdrawal position so that its panel (not shown) protrudes and abuts against the side of the packaging box 1.

FIG. 4 illustrates the third and fourth fixing plate devices 33 and 34 and the suction fixing device 35. The third and fourth fixing plate devices 33 and 34 are spaced apart from and face each other in a width direction Y perpendicular to the transfer direction X to serve to fix both sides of the packaging box 1.

The third fixing plate device 33 includes a first block 331 fixed to the frame 10 beneath the first conveyor 11, a first pneumatic cylinder 332 actuated vertically from the first block 331, a second block 333 coupled to the tip of the first pneumatic cylinder 332, a second pneumatic cylinder 334 actuated horizontally from the second block 333, and a fixing plate 335 coupled to the tip of the second pneumatic cylinder 334 to abut against the side of the packaging box 1.

The second block 333 and the elements attached thereto are moved by the actuation of the first pneumatic cylinder 332 between a resting position on the bottom of the packaging box 1 and an operating position (state illustrated in FIG. 4) at which the fixing plate 335 abuts against the side of the packaging box 1 by rising from the resting position.

In the operating position, the second pneumatic cylinder 334 is actuated so that the fixing plate 335 protrudes and abuts against the side of the packaging box 1 to support the packaging box.

The fourth fixing plate device 34 includes a fixing block 341 fixedly coupled to the frame 10, a pneumatic cylinder 342 actuated horizontally from the fixing block, and a fixing plate 343 coupled to the tip of the pneumatic cylinder 342 to abut against the side of the packaging box 1.

The fixing plate 343 is spaced apart from the packaging box 1. When the packaging box 1 is transferred to a position for taking out the in-line container 6, the pneumatic cylinder 342 is actuated so that the fixing plate 343 moves horizontally toward the packaging box 1 and abuts against the side thereof.

The suction fixing device 35 is disposed beneath between the two conveyor belts of the 1st conveyor 11.

The suction fixing device 35 includes a vacuum aspirator 351 that abuts against the bottom of the packaging box 1 to perform vacuum suction. The vacuum aspirator 351 is connected to a vacuum source and is vertical movable (as indicated by arrow Z) by a pneumatic cylinder (not shown).

When the packaging box 1 is transferred to the withdrawal position, the vacuum aspirator 351 rises from the bottom of the first conveyor 11 by the pneumatic cylinder to suck and fix the packaging box 1, and then moves down again when all the in-line containers 6 are taken out so that the packaging box is empty.

The first to fourth fixing plate devices 31 to 34 and the suction fixing device 35 fix the four sides and bottom of the packaging box 1. Accordingly, these devices prevent the packaging box 1 from lifting up or shaking in the transfer direction or width direction thereof when each in-line container 6 is taken out of the packaging box 1 by the withdrawal device 40.

Referring back to FIGS. 2 and 3, the withdrawal device 40 is disposed above the fixing means.

The withdrawal device 40 is coupled to an upper frame 12 forming a part of the frame 10. A clamp 50 configured to directly clamp the in-line container 6 for taking it out is moved in the transfer direction X, the width direction Y, and the vertical direction Z with respect to the upper frame 12.

Figure 5:
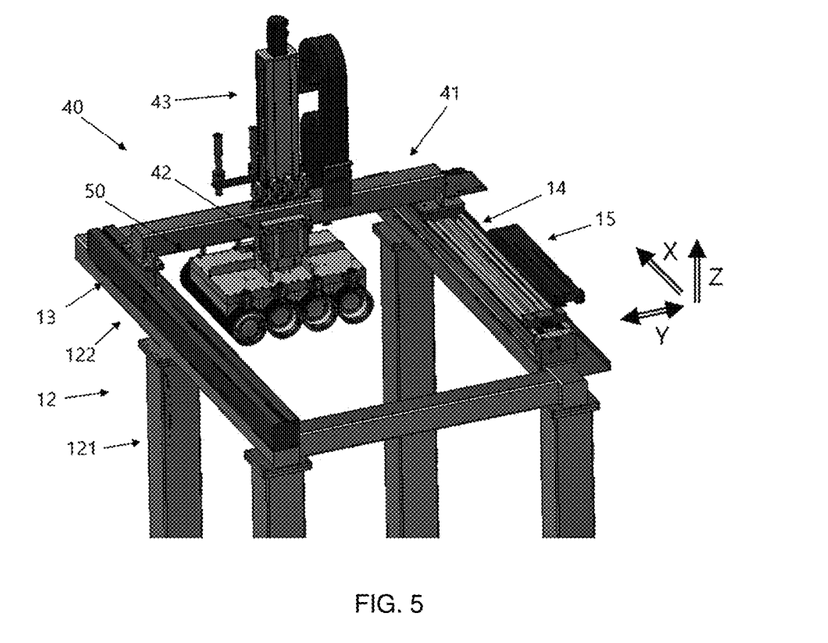
FIG. 5 is a perspective view illustrating a state in which a withdrawal device is mounted on a frame in the system according to the embodiment of the present disclosure.

First, the overall configuration of the withdrawal device 40 will be described with reference to FIG. 5.

The upper frame 12 is composed of four vertical channels 121 and four horizontal channels 122 forming a rectangle with each other. Among them, the two horizontal channels 122 extending in the transfer direction X and parallel to each other are provided with linear guides 13 and 14.

A mounting block 41 extends in the width direction Y across the linear guides 13 and 14. The mounting block 41 is movable in the transfer direction X by the transfer mechanism 15 provided in the linear guide 14.

The mounting block 41 is provided with a mounting bracket 42 movable in the longitudinal direction of the mounting block 41, i.e., in the width direction Y. The pneumatic piston 43 movable vertically is fixed to the mounting bracket 42, and the clamp 50 is coupled to the lower tip of the pneumatic piston 43. Accordingly, the clamp 50 is movable in the transfer direction X, the width direction Y, and the vertical direction Z.

The configuration of the clamp will be described with reference to FIGS. 6 to 10.

The clamp 50 has first and second blocks 51 and 52, which are disposed up and down and coupled to each other to form the clamp. The first block 51 has a fixing bracket 53 provided on the upper surface thereof to attach the clamp 50 to the tip of the pneumatic piston 43. The first block 51 has four sensors 54 attached side by side to the front side thereof in the transfer direction X to detect the direction of the in-line container 6.

Figure 10:
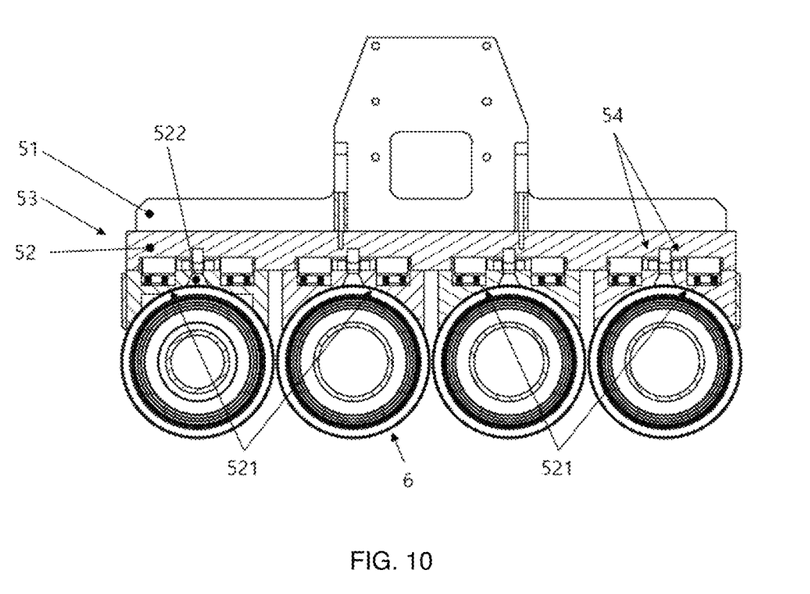

First, the configuration of the clamp will be described with reference to FIG. 10, which is a cross-sectional view taken along line D-D of FIG. 7 which is a top view of the clamp.

The second block 52 has four concave arc-shaped suction surfaces 521 provided on the lower surface thereof, and the top surface of each in-line containers 6 may be inserted into and abut against an associated one of the suction surfaces 521. A through-hole 522 for vacuum suction is formed at the center of each suction surface 521. The through-hole 522 extends outward through the first block 51 to be subjected to vacuum suction pressure from an external vacuum source.

The in-line container 6 is formed by wrapping a plurality of containers in a packaging film (not shown). The packaging film is sucked into the through-hole 522 by vacuum suction from the through-hole 522 and the packaging film on the in-line container 6 is pressed against the suction surface 521 by applying a negative pressure to the entire suction surface 521, thereby fixing the in-line container 6 to the clamp 50 in response to the load of the in-line container 6.

Meanwhile, two pins (54 in FIG. 10) are provided on both sides of the through-hole 522 to serve as a mechanism for fixing the plastic film drawn into the through-hole 522 by the negative pressure acting on the through-hole 522. The pins (54 in FIG. 10) are operated horizontally by a solenoid mechanism (not shown). After the plastic film on the in-line container 6 is drawn into the through-hole 522 by the vacuum suction pressure applied during clamping of the in-line container 6, the pins (54 in FIG. 10) move in an abutting direction and press and clamp the packaging film on the in-line container 6 therebetween.

Referring back to FIG. 6, the second block 52 is provided with the four suction surfaces 521 parallel to each other to suck the four in-line containers. Here, the length of each of the first and second blocks 51 and 52 is shorter than the length of the in-line container 6, and both longitudinal ends 6-1 and 6-2 of the in-line container 6 are exposed from the longitudinal ends of the clamp 50 during clamping.

The sensors 54 are provided on the side of the first block 51 to operate along and detect the diameter of the in-line container 6.

As described above, each of the containers forming the in-line container 6 is configured such that the open top surface thereof has a larger diameter than the bottom surface thereof. Therefore, when the in-line container 6 is formed by overlapping containers, the longitudinal end 6-1 of the in-line container 6 corresponding to the top surface thereof has a larger diameter than the longitudinal end 6-2 of the in-line container 6 corresponding to the bottom surface thereof.

Figure 7:
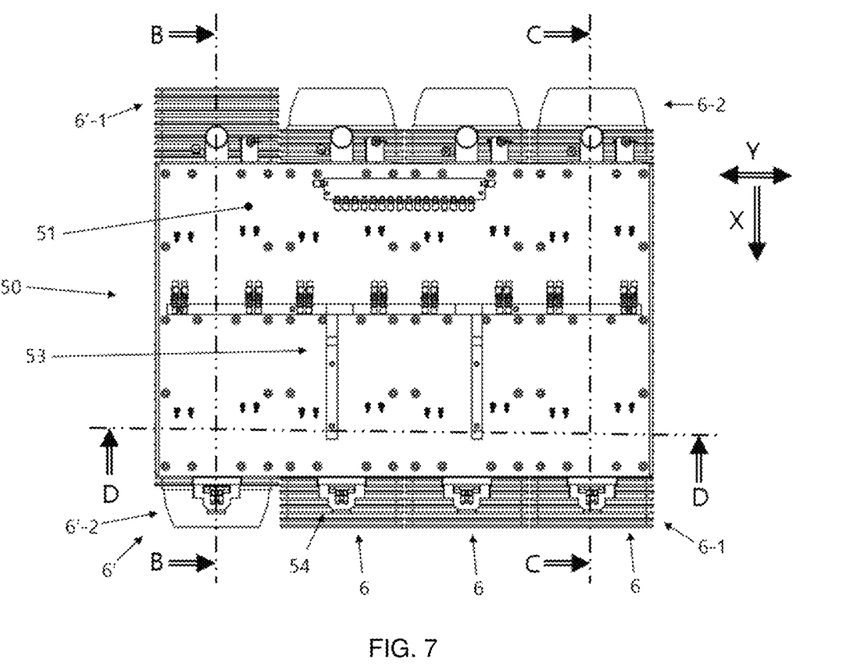

FIG. 7 illustrates four in-line containers clamped and taken out by the clamp 50. As an example, one in-line container 6' is different from other in-line containers 6 in that the bottom end 6'-1 thereof is placed on the side where the sensor 54 is disposed.

In the system of the present embodiment, the in-line containers 6 are taken out of the packaging box and aligned, and then transferred to a place of use with the plastic film thereon removed.

Accordingly, the in-line containers 6 taken out in the system of the present embodiment must be aligned in the same direction. However, if one in-line container 6' of the in-line containers 6 is placed in a different direction due to the operator's mistake when the in-line containers 6 are inserted into the packaging box 1, the in-line container 6' placed in a different direction is transferred to the next process as it is in the system for taking out, aligning, and transferring the in-line container 6. Hence, this causes a problem in the process of removing the packaging film from the in-line container 6 and supplying the containers.

Figure 8:
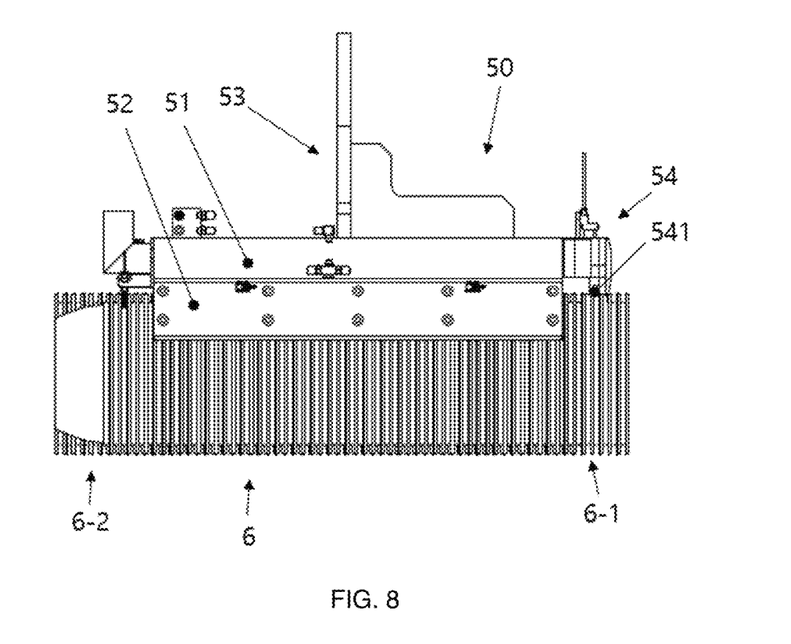
FIGS. 8 to 10 are cross-sectional views taken along lines B-B, C-C, and D-D of FIG. 7.
Figure 9:
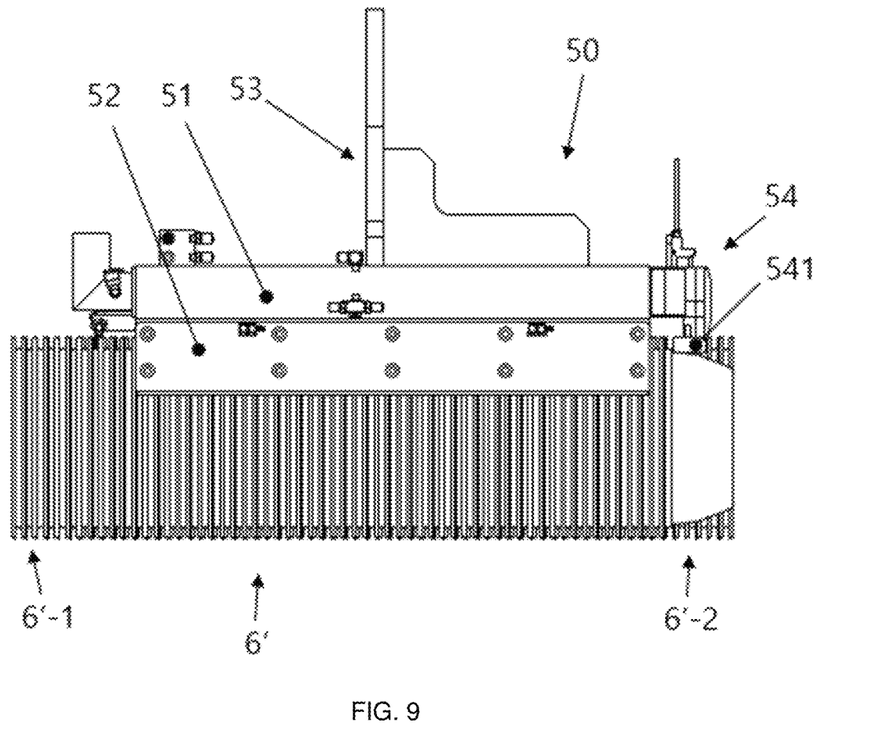

FIGS. 8 and 9, which are cross-sectional views taken along lines E-E and F-F of FIG. 7, are cross-sectional views illustrating that the in-line container 6 in a normal direction and the in-line container 6' in a different direction are clamped by the clamp 50.

Each sensor 54 includes a bar 541 fixedly coupled to the base plate 51 and moved up and down. The bar 541 moves upward when abutting against one end of the in-line container 6 or 6'. The bar 541 of the sensor 54, at the position where the in-line container 6 in the normal direction is clamped, is pushed upward. On the other hand, the bar 541 of the sensor 54, at the position where the in-line container 6' in the opposite direction is clamped, is not pushed upward because the bar 541 abuts against the bottom end 6'-2 of the in-line container 6'.

As such, the sensor 54 operates to detect the presence and position of the in-line container 6' placed in the opposite direction.

Referring back to FIGS. 2 and 3, the first transfer conveyor 60 and the rotating device 80 are disposed downstream of the withdrawal device 40, the first transfer conveyor 60 serves as the item transfer means for transferring the in-line container 6 taken out by the withdrawal device 40 therethrough, and the rotating device 80 rotates the in-line container 6' placed in a different direction.

Figure 12:
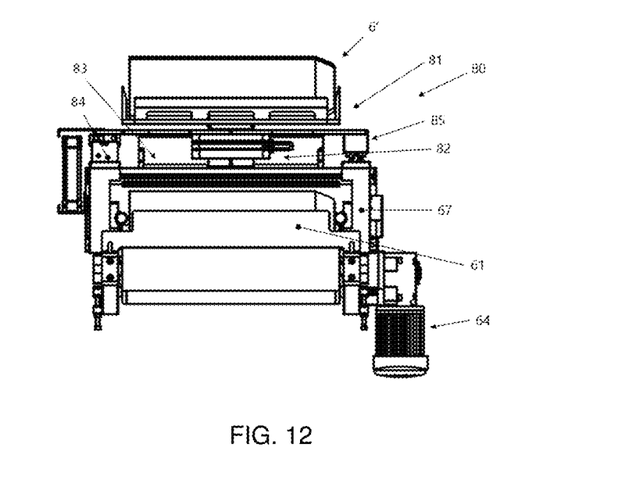
Figure 13:
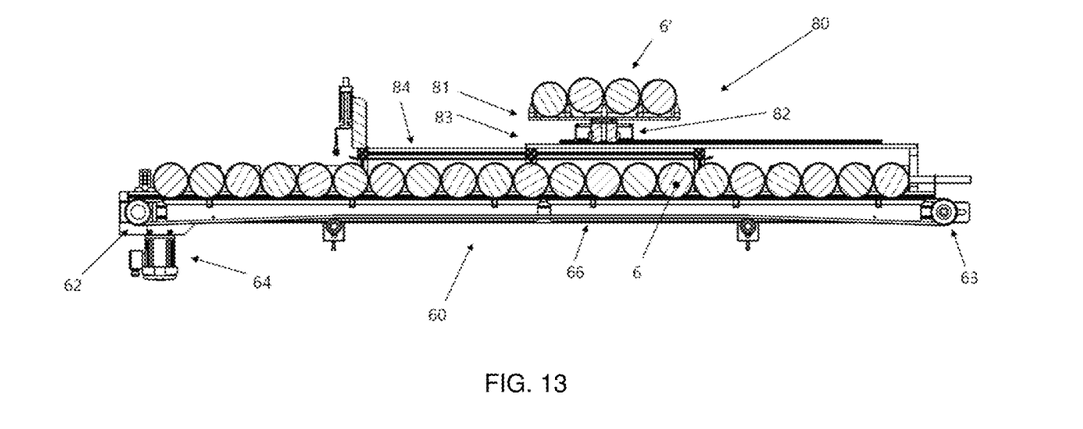

The configuration of the first transfer conveyor 60 and the rotating device 80 will be described with reference to FIGS. 11 to 13.

The first transfer conveyor 60 has a conveyor belt 61 through which the in-line containers 6 are transferred longitudinally in parallel to each other. The conveyor belt 61 is circulated between a drive roller 62 and a driven roller 63 which are rotated by a drive motor 64. A support frame 66 is provided to support the rollers 62 and 63, the conveyor belt 61, and the drive motor 64.

The conveyor belt 61 is driven in the width direction Y perpendicular to the transfer direction X of the packaging box, and this width direction is the transfer direction in which the in-line container 6 is transferred by the first transfer conveyor 60.

In the following description in connection with the configuration and operation of the first transfer conveyor 60 and the rotating device 80, the direction in which the first transfer conveyor 60 transfers the in-line container 6 will be referred to as the transfer direction Y, and the width direction of the first transfer conveyor 60 perpendicular to the transfer direction will be referred to as the width direction X.

The withdrawal device 40 moves further in the transfer direction X of the packaging box from the position where the in-line container 6 is taken out of the packaging box 1. Then, the withdrawal device 40 moves upward of the first transfer conveyor 60 and lowers the clamp 50 to place the in-line container 6 on the conveyor belt 61 of the first transfer conveyor 60. Accordingly, the in-line container 6, which is placed on the conveyor belt 61 of the first transfer conveyor 60, is transferred to the subsequent process.

The rotating device 80 is disposed above the first transfer conveyor 60.

The rotating device 80 includes a rotary table 81 configured to place four in-line containers 6 thereon, a rotary drive mechanism 82 including a drive motor for rotating the rotary table 81, and a linear drive table 83 to which the rotary drive mechanism 82 is coupled and supported.

A mounting frame 66 for mounting the rotating device 80 is provided on the support frame 65 of the first transfer conveyor 60. The mounting frame 66 extends in the transfer direction Y of the in-line container 6 from the front of the first transfer conveyor 60, on which the clamp 50 places the in-line container 6, to the rear thereof to which the in-line container 6 is transferred.

The mounting frame 65 has a linear drive mechanism 84 for moving the linear drive table 83 in the transfer direction Y on one side of the first transfer conveyor 60 in the width direction X thereof, and a rail 85 for guiding and supporting the linear motion of the linear drive table 83 on the other side of the first transfer conveyor 60.

A rotary drive mechanism 82 is provided on the upper surface of the linear drive table 83, and the rotary table 81 is placed on the rotary drive mechanism 82 to rotate.

The clamp 50 of the withdrawal device places the in-line container 6 in the normal direction on the first transfer conveyor 60, and places the in-line container 6' in the opposite direction on the rotary table 8 of the rotating device. The rotary table 81 of the rotating device 80 is rotated by 180 degrees so that the direction of the in-line container 6' is changed to the normal direction. Then, the clamp 50 moves the in-line container 6', changed in the normal direction, from the rotating device 80 to the first transfer conveyor 60.

Referring back to FIG. 4, the second transfer conveyor 70 as a box transfer means for transferring the empty packaging box 1 from which the in-line container 6 is taken out will be described.

All the in-line containers 6 are taken out of the packaging box 1, and the empty packaging box 1 is transferred to another position, and another packaging box is transferred to the withdrawal position by the first conveyor 11. The second transfer conveyor 70 constituting a box transfer means is disposed beneath between the two conveyor belts of the first conveyor 11.

The second transfer conveyor 70 is provided with a block 71 fixedly coupled to the frame 10, and two cylinders 72 that move in the vertical direction Z with respect to the block 71 and are arranged side by side in the width direction Y. Each of the cylinders 72 has a conveyor mechanism 73 mounted to the tip thereof, and the conveyor mechanism 73 moves in the vertical direction Z by the cylinder 72.

The conveyor mechanism 73 is provided with two pulleys 74 spaced apart in the width direction Y and a belt 75 wound around the pulleys 74. The pulleys 74 are rotated by a drive motor (not shown) for circulation of the belt 75.

The conveyor mechanism 73 is disposed beneath the first conveyor 11. Thus, the conveyor mechanism 73 does not interfere with the bottom of the packaging box 1 when the packaging box 1 is transferred by the first conveyor 11. The conveyor mechanism 73 moves up when the cylinder 72 is actuated after all the in-line containers 6 are taken out of the packaging box 1.

The belt 75 of the conveyor mechanism comes into contact with the bottom of the packaging box 1 so that the packaging box 1 moves up to be spaced apart from the first conveyor 11. The belt 75 is circulated to transfer the packaging box 1 in the width direction Y.

Although not illustrated in the drawings, another conveyor for transferring an empty packaging box 1 is provided next to the first conveyor 11. Thus, the packaging box 1, which is moved in the width direction Y by the second transfer conveyor 70 and deviated from the withdrawal position, is removed from the system of the present embodiment.

The overall operation of the system having the above configuration will be described.

The packaging box 1 in which the in-line container 6 is accommodated through the first conveyor 11 and all the upper panels 2 to 5 are opened is transferred to the withdrawal position.

When the packaging box 1 is transferred to the withdrawal position, the first conveyor 11 stops, and the first to fourth fixing plate devices 31 to 34 and the suction fixing device 35 operate to support the packaging box 1 and fix it at the withdrawal position.

Next, the clamp 50 of the withdrawal device moves to the top of the packaging box 1 by the movement of the mounting block 41 in the transfer direction X and the movement of the mounting bracket 42 in the width direction Y. Next, the clamp 50 is moved downward by the operation of the pneumatic piston 43 to move into the packaging box 1 so that the four containers of the in-line container 6 are placed on the respective suction surfaces 521.

The packaging box 1 is transferred in the state in which it is disposed such that the longitudinal direction of the in-line container 6 is the transfer direction X when the packaging box 1 is placed on the first conveyor 11. The clamp 50 is also fixed to the tip of the pneumatic piston 43 such that the longitudinal direction of each suction surface 521 is the transfer direction X.

When the in-line container 6 is placed on the suction surface 521, the in-line container 6 is fixed by vacuum suction and subsequent pins 532 so that it is fixed to the clamp 50. Next, the clamp 50 moves to the first transfer conveyor 60 by the operation of the withdrawal device 40, and the fixation of the in-line container 6 by the vacuum suction and the pins is released so that the containers of the in-line container 6 are transferred side by side by the first transfer conveyor 60.

Meanwhile, when the sensor 54 detects an in-line container 6' placed in an opposite direction, the clamp 50 first moves above the rotating device 80 and operates to release the in-line container 6' from the suction surface 521 associated therewith to place the in-line container 6' on the table 81 of the rotating device.

Figure 14:
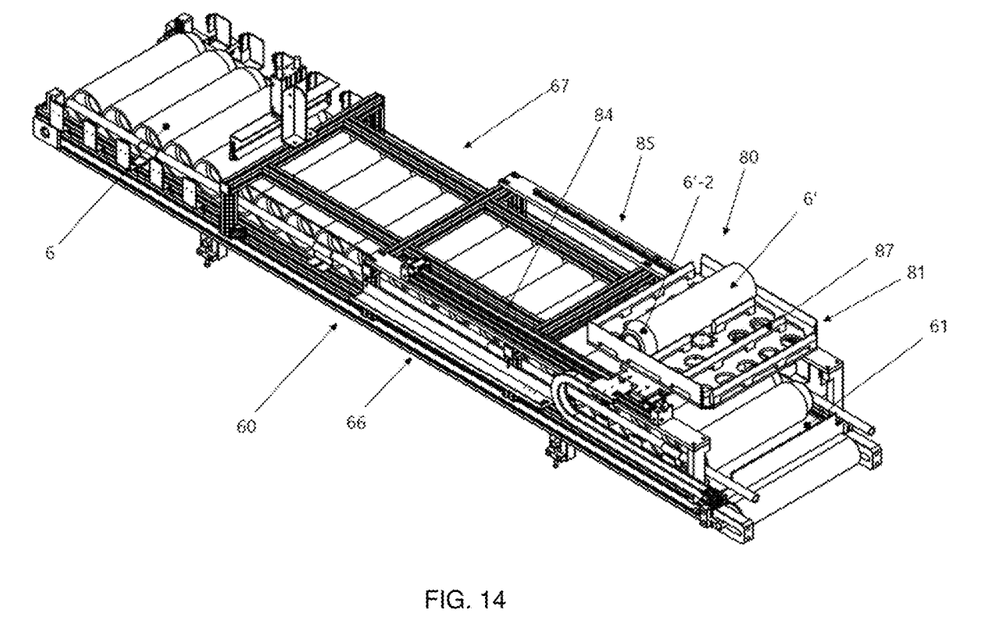
FIGS. 14 and 15 are perspective views illustrating an operation of the rotating device in the system according to the embodiment of the present disclosure.

FIG. 14 illustrates that, when the direction of one in-line container 6' of the four in-line containers 6 taken out of the packaging box 1 is opposite to the directions of the other in-line containers, i.e., when the bottom end 6'-2 of the container is placed forward in the transfer direction X, the clamp 50 places only that in-line container 6' on the rotary table 81 of the rotating device.

Figure 11:
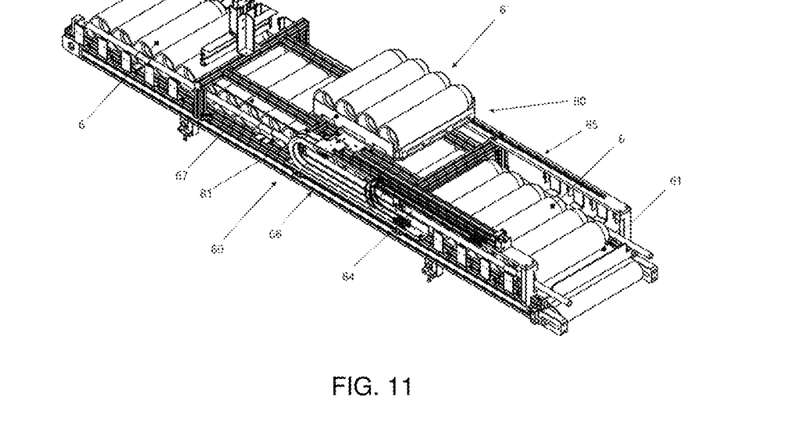
FIGS. 11 to 13 are perspective, front, and longitudinal cross-sectional views illustrating a rotating device and a first transfer conveyor for transferring items in the system according to the embodiment of the present disclosure.

When the clamp 50 places the in-line container 6 taken out of the packaging box 1 on the conveyor belt 61 of the first transfer conveyor 60, the linear drive table 83 of the rotating device is at an avoidance position illustrated in FIG. 11. Accordingly, the linear drive table 83 and the rotary table 81 coupled thereto do not interfere with the operation of the clamp 50 to place the in-line container.

Figure 15:
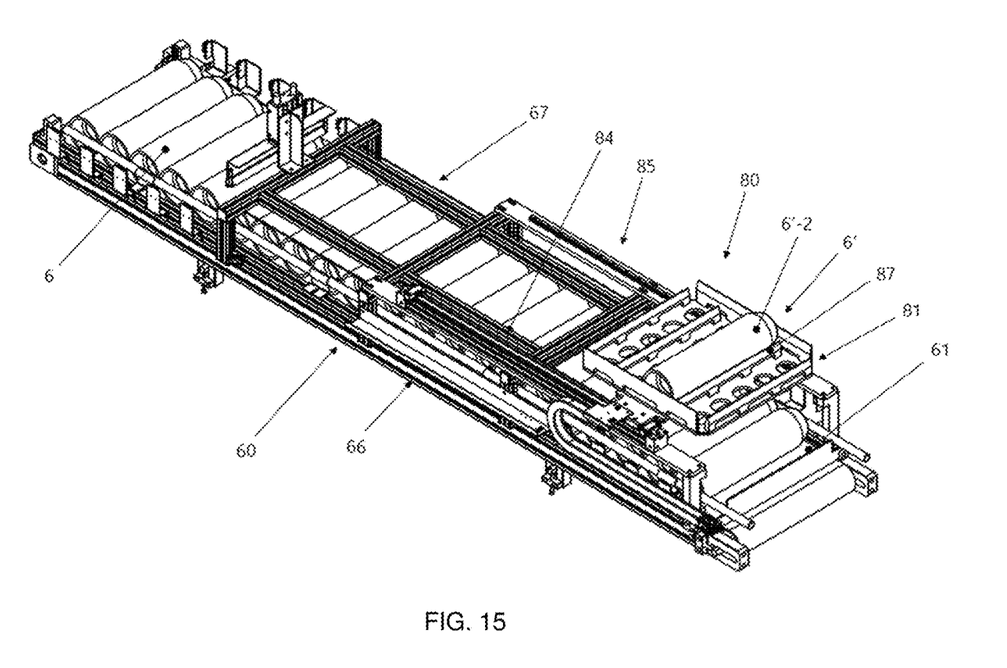

When there is an in-line container 6' placed in an opposite direction from among the four in-line containers taken out of the packaging box 1 by the clamp 50, the linear drive table 83 is moved by the linear drive mechanism 84 to the position where the clamp 50 places the in-line container 6 on the first transfer conveyor 60, and the clamp 50 places the in-line container 6' in the opposite direction on the rotary table 81, as illustrated in FIGS. 14 and 15.

A partition plate 87 is provided on the upper surface of the rotary table 81 to partition the in-line container 6' so as not to move due to the rotation of the rotary table 81. Thus, the in-line container 6' is placed at any one of the four positions partitioned by the partition plate 87.

FIGS. 14 and 15 illustrate that only one in-line container 6' in the opposite direction is placed on the rotary table 81. In some cases, two or more or all of the four in-line containers simultaneously taken out by the withdrawal device 40 may be placed in an opposite direction.

The withdrawal device 40 places the in-line container 6' in the opposite direction on the rotary table 81 and keeps the in-line container 6 in the normal direction clamped. Next, after the linear drive table 83 moves to the avoidance position, the clamp 50 places the in-line container 6' in the normal direction on the first transfer conveyor 60. The rotary table 81 is rotated by 180 degrees from the avoidance position and the clamp 50 moves back to the position where the in-line container is placed.

FIG. 15 illustrates such a state. The in-line container 6' has the bottom end 6'-2 opposite to that illustrated in FIG. 14, i.e., has the same end as the in-line container in the normal direction. The clamp 50 clamps the in-line container 6'.

The rotary table 81 and the linear drive table 83 are moved to the avoidance position, and the clamp 50 places the in-line container 6 whose direction is changed on the conveyor belt 61 of the first transfer conveyor 60.

Through this process, the in-line container 6' in the opposite direction is disposed in the same direction as the other in-line container 6 and transferred to the subsequent process by the first transfer conveyor 60.

Meanwhile, when the four in-line containers 6' simultaneously taken out of the packaging box 1 by the clamp 50 are oriented in the opposite direction, the rotary table 81 is immediately rotated by 180 degrees without moving the linear drive table 83 of the rotary device 80 to the avoidance position. In addition, after the clamp 50 clamps all the four in-line containers 6', the linear drive table 83 moves to the avoidance position so that the in-line containers 6' clamped by the clamp 50 are placed on the conveyor belt 61 of the first transfer conveyor.

By repeating this process, all the in-line containers 6 are taken out of the packaging box 1 while the directions thereof are aligned. Then, the in-line containers 6 are transferred by the first transfer conveyor 60 to a subsequent process, i.e., a process of removing the packaging vinyl from the in-line containers 6.

When all the in-line containers 6 and 6' are taken out of one packaging box 1 so that the packaging box 1 is emptied, the second transfer conveyor 70 rises from the bottom of the first conveyor 11 to separate the empty packaging box 1 from the first conveyor 11. Next, the belt 75 is circulated to move the empty packaging box 1 out of the system from the withdrawal position.

In this way, the packaging box 1 accommodating the in-line container 6 is introduced into the system of the present embodiment, and the in-line container 6 is taken out by the withdrawal device 40 and transferred to the subsequent process by the first transfer conveyor 60. The empty packaging box is removed from the system by the second transfer conveyor 60 and transferred to the subsequent process.

Although the system for aligning in-line containers according to the embodiments of the present disclosure has been described in terms of configuration and operation thereof, the present disclosure is not limited to such embodiments and various modifications and additions of elements are possible within the spirit and scope of the disclosure as defined in the following claims.

The invention claimed is:

1. A system for taking out, aligning, and transferring items accommodated in a packaging box with an open top, comprising:
a packaging box transfer device configured to transfer a packaging box accommodating items therein;
a fixing device configured to fix, at a withdrawal position where the items are taken out of the packaging box, the packaging box transferred by the packaging box transfer device with its top open;
a withdrawal device configured to move to a space in which the items are accommodated in the packaging box so as to suck and take out the items;
an item transfer device configured to transfer the items taken out by the withdrawal device with the items placed on the item transfer device;
a sensor mounted on the withdrawal device to detect directions of the items taken out by the withdrawal device; and
a rotating device configured to rotate the items taken out by the withdrawal device with the items placed on the rotating device,
wherein when the direction of each item detected by the sensor is different from a predetermined item direction, the withdrawal device places the item on the rotating device, and after the rotating device rotates to change the direction of the item to the predetermined direction, the item is clamped and transferred to the item transfer device by the withdrawal device.

2. The system according to claim 1, wherein:
each of the items has different diameters at both longitudinal ends thereof, and the sensor detects the direction of the item by detecting the diameter of one end thereof;
the item transfer device transfers the items with their longitudinal axes parallel to each other; and
the items are rotated with their longitudinal directions placed perpendicular to an axis of rotation of the rotating device.

3. The system according to claim 2, wherein:
a plurality of items are accommodated in parallel with each other and stacked vertically in the packaging box, and the withdrawal device simultaneously takes out the items accommodated in parallel with each other; and
an item, which is not oriented in the predetermined item direction, of concurrently taken out items is placed on and rotated by the rotating device, and then transferred by the withdrawal device to the item transfer device.

4. The system according to claim 1, wherein:
the item transfer device comprises a conveyor belt on which the items are arranged and transferred by the withdrawal device, and the rotating device is disposed above the conveyor belt of the item transfer device;
the rotating device moves between an upper side of a placement position where the withdrawal device places the items on the conveyor belt of the item transfer device and an avoidance position spaced from the upper side of the placement position in an item transfer direction of the item transfer device; and
when the withdrawal device places, on the rotating device, an item oriented in a direction different from the predetermined item direction, the rotating device moves to the upper side of the placement position, and when the withdrawal device places the item on the conveyor belt of the item transfer device, the rotating device moves to the avoidance position.

5. The system according to claim 4, wherein the rotating device comprises rails extending along both widthwise sides of the conveyor belt of the item transfer device, a linear drive table moving along the rails, a rotary table configured to rotate about its vertical axis with respect to the linear drive table, and a rotary drive mechanism configured to rotate the rotary table.

* * * * *